United States Patent [19]

Ragnegård et al.

[11] Patent Number: 4,519,910
[45] Date of Patent: May 28, 1985

[54] APPARATUS FOR REMOVING A FIBER LAYER FROM A ROTATING DISC FILTER

[75] Inventors: Samuel Ragnegård, Hedemora; Kent Strid, Grängesberg; Göran Sundkvist, Hedemora, all of Sweden

[73] Assignee: AB Hedemora Verkstalder, Hedemora, Sweden

[21] Appl. No.: 512,075

[22] Filed: Jul. 8, 1983

[51] Int. Cl.³ .................. B01D 25/34; B01D 33/26
[52] U.S. Cl. ....................... 210/327; 210/331; 210/332; 210/334; 210/347; 210/391
[58] Field of Search ............ 210/236, 241, 327, 331, 210/334, 332, 347, 391, 393, 396; 162/275, 277, 279

[56] References Cited

U.S. PATENT DOCUMENTS

| 2,932,402 | 4/1960 | Logue | 210/331 |
| 3,317,050 | 5/1967 | Daman | 210/331 |
| 3,471,026 | 10/1969 | Riker | 210/332 |
| 3,490,595 | 1/1970 | Krymski | 210/331 |
| 3,643,806 | 2/1972 | O'Cheskey | 210/332 |
| 4,131,548 | 12/1978 | Peterson | 210/332 |

Primary Examiner—Ernest G. Therkorn
Attorney, Agent, or Firm—Pollock, Vande Sande and Priddy

[57] ABSTRACT

An apparatus for removing a fiber layer from a rotating disc filter consisting of a number of filter discs mounted side by side on a common shaft includes gas or liquid nozzles for said removal. The spray nozzles are rigidly connected to slide shoes, each of which is guided by a guide rail positioned about the periphery of each filter disc. The slide shoe is arranged with play relative to the guide rail and is suspended as a pendulum.

8 Claims, 6 Drawing Figures

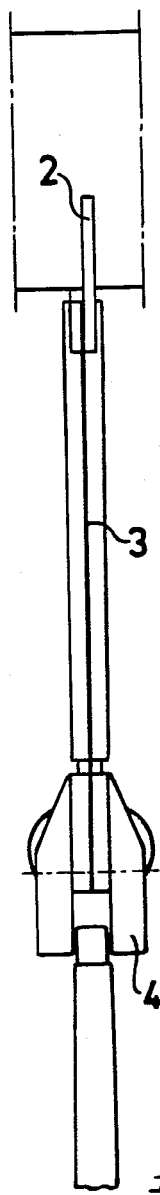
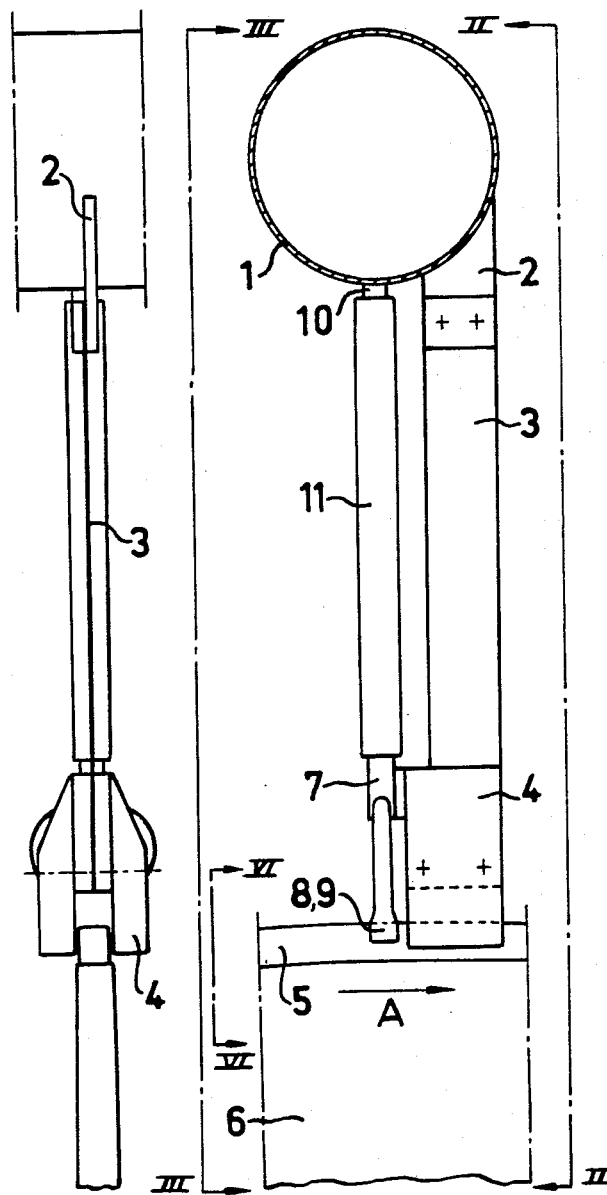
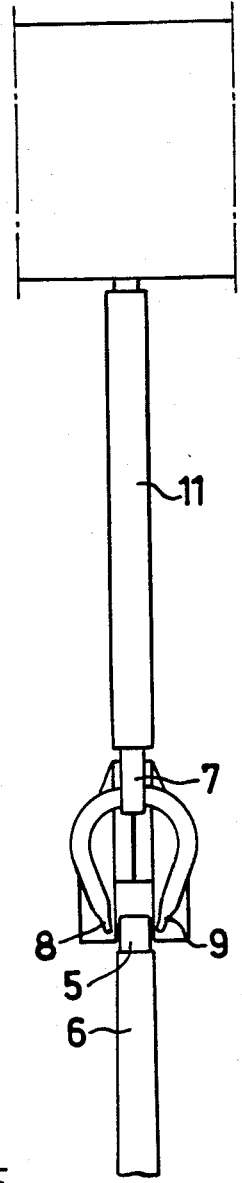

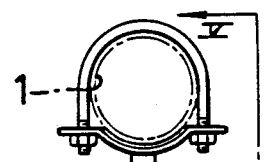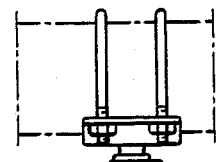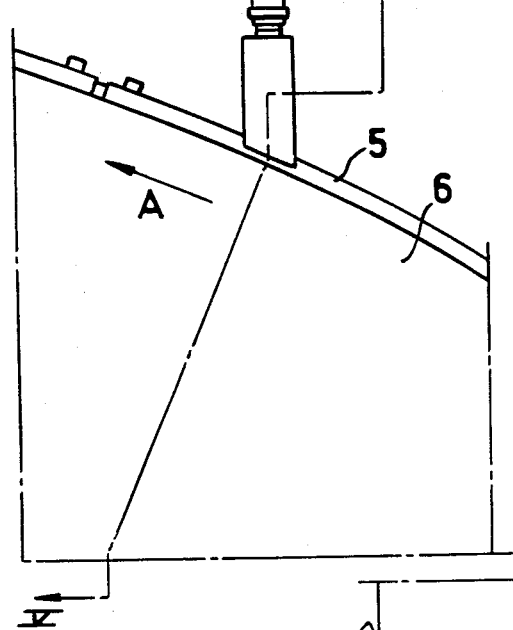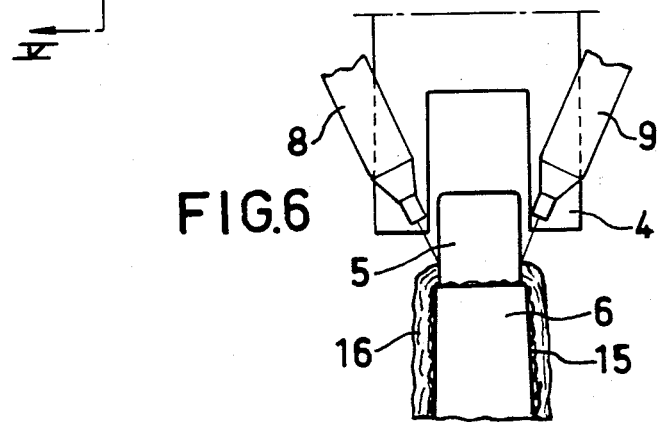

APPARATUS FOR REMOVING A FIBER LAYER FROM A ROTATING DISC FILTER

The present invention relates to an apparatus for removing a fiber layer from a rotating disc filter. The invention is preferably applicable for the use of such filters in the cellulose and paper industry.

Disc filters are used in the cellulose and paper industry for cleaning back water and for thickening fiber suspensions. Such a filter comprises a horizontal shaft having axial channels discharging in one end of the shaft and a number of filter discs mounted radially on the shaft. Each filter disc consists of a number of sectors, each of which is connected to a respective channel in the shaft. The disc filter is arranged in a trough and is to about 50% immersed into the fiber suspension to be filtered. Said one end of the shaft is connected to a so called suction head wich usually is connected to a barometric fall tube. When the disc filter is rotating in the trough, the fiber suspension in the trough is filtrated through the filter discs due to the pressure difference between the fiber suspension in the trough and the interior of the filter discs, the pressure difference being caused by the barometric fall tube. A fiber layer is formed on the part of the discs being immersed in the suspension. In order to obtain a continuous process the fiber layer is removed from the sectors of the discs as they come up out of the trough so that they are free from fibers when they return down into the trough.

The fiber layer can be removed by means of a liquid spray which loosens the fiber layer at the periphery of the disc filter and the cake falls by gravity down into a discharge screw. A large portion of the liquid from the liquid spray lands in the fiber layer, which thereby is diluted and obtains lower dry content, which in many cases is a clear disadvantage. One way to avoid this is to use air, pressure air, instead of liquid. A pre-requisite is then that air pressure and air consumption be kept at a reasonable level, since compressed air in this connection is a relatively expensive medium. This means, among other things, that the air spray must be positioned as close the disc filter as possible since the effect of the air discharged from the spray decreases principally in inverse proportion to the square of the distance. A difficulty here is that the construction of the disc filter is such that a certain axial fling always exists at its periphery. An elimination of this fling should involve an unreasonable expensive construction.

A further disadvantage in having a compressed air nozzle positioned at a relatively large distance from the disc filter with accompanying higher blow pressure is that fibers from the disc filter are blown around and deposit on the different parts of the filter resulting in risk for operation disturbances.

A solution of above mentioned problem is to allow the nozzle to follow the axial flings of the disc filter periphery. One such solution is described in Peterson U.S. Pat. No. 4,131,548. A slurry cake is intended to be scraped off the filter. In order to obtain an even scraping-off of the cake in spite of the axial flings of the filter disc, a slide shoe to which a scraper is rigidly connected is allowed to slide against a guide rail positioned about the periphery of each filter disc. This solution, however, brings about a considerable wear on the slide shoe and guide rail and cause frequent shutdown of the system due to deposits of filter cake on the guide rail and slide shoe. Another difficulty when using such an apparatus in the cellulose and paper industry is that the environment, in which it shall operate, is troublesome with its high atmospheric humidity, temperatures above 90° C. and corrosive atmosphere with usually low pH-value.

An object of the present invention is therefor to provide an apparatus for fiber layer removal by spray means for gas and/or liquid in which said spray means in a guaranteed manner follows the fiber layer at a small distance, and in which the above mentioned problems concerning operation disturbances and economy are eliminated.

The apparatus according to the invention for removing a fiber layer from a rotating disc filter including a number of filter discs mounted side by side on a common shaft comprises a gas and/or liquid spray means for removing the fiber layer and positioned close to the periphery of the filter disc, a slide shoe fixed in relation to said spray means, and guide means positioned about the periphery of the filter disc for guiding said slide shoe, and for attaining said object the apparatus according to the invention is characterized in that said slide shoe is arranged with play relative to said guide means and is suspended as a pendulum means.

Considerable advantages over the prior art are achieved by the present invention. The slide shoe does not slide against the guide means except upon very extreme flings of the disc filter periphery, and consequently wear and operation problems have almost entirely been eliminated. The spray means follows the fiber layer at a very close distance and therefor gas or liquid pressure can be kept at a low level. However, perhaps the most important advantage is that the slide shoe in spite of comparatively large flings of the disc filter periphery, exceeding the size of the play between slide shoe and guide means, does not come into contact with the guide means except occasionally due to reaction forces on the spray means from the air on liquid jets. These reaction forces manage mostly to adjust the distance to the fiber layer upon flings provided that the spray means is suspended in a pendulum-like construction. As a result, the slide shoe could principally be more or less superfluous but it is together with the guide means arranged to assure that very quick and large flings of the periphery shall be parried and to guarantee that an unsuitably large distance between spray means and fiber layer can not arise.

Tests on known disc filters in operation have proved, that the mouth of a stationary spray means must be positioned at an average distance of about 20—30 mm lateral of the periphery of the filter disc. Required air pressure in this case for removing the fiber layer was 500-600 kPa. If said spray means instead is arranged so that it follows the axial flings of the disc periphery, it can be positioned at a distance of only 2-3 mm, and the required air pressure is then reduced to about 50 kPa. This means for the same spray mouth a difference in air consumption of the order of magnitude 1:10. Thus, the condition for an economic use of a gas when removing a fiber layer is that the spray means is positioned close to the disc periphery and irrespective of the axial flings of the disc. The distance should not exceed 5 mm, preferably not 3 mm, in order to keep the air consumption at a reasonable level and also to avoid that fibers blow around resulting in the above mentioned disadvantages. A corresponding distance should exist when using liquid as spray medium. By the present invention it is guaranteed that such a distance is maintained during the operation of the disc filter.

According to one embodiment of the invention said spray means is positioned ahead of the slide shoe in the rotational direction of the filter disc. The slide surfaces of said guide means can accordingly be cleaned before the passage of the slide shoe, which eliminates the risk of operation disturbances due to deposits on said guide means.

BRIEF DESCRIPTION OF THE DRAWINGS

Embodiments of the invention will now be described more in detail with reference to the accompanying drawings, in which:

FIG. 1 is a side view of one preferred embodiment of the invention,

FIG. 2 is a view seen in the direction of II—II in FIG. 1,

FIG. 3 is a view seen in the direction of III—III in FIG. 1,

FIG. 4 is a side view of another embodiment,

FIG. 5 is a view seen in the direction of V—V in FIG. 4, and

FIG. 6 is a view of a portion of the apparatus, in larger scale and partly in section, in the direction of VI—VI in FIG. 1.

DETAILED DESCRIPTION OF THE DRAWINGS

FIG. 1 shows a main tube 1 for gas, for instance air, or liquid, for instance water. A bracket 2 is attached to the tube and a spring element 3, preferably a leaf spring, is attached to the bracket. The spring element 3 comprises a movable fastening means for a slide shoe 4 attached to the opposite end of the spring 3. The slide shoe is with play arranged over a guide rail 5 mounted around the periphery of a filter disc 6, and a disc filter consists of a number of such filter discs mounted side by side on a common shaft. The spring 3 accordingly acts as a pendulum with lateral movement limitations by contact between the slide shoe 4 and the side surfaces of the guide rail 5. Spray nozzles 8, 9 on each side of the periphery of the filter disc are fixed to the slide shoe 4, for instance as shown via a connection tube 7 for the spray medium. When the filter disc 6 upon rotation (arrow A) moves in an axial direction, i.e. flings, the spray nozzles 8, 9 will follow this movement, mainly because of the reaction forces from the sprays but in certain cases due to the fact that the slide shoe 4 momentarily comes into contact with the guide rail 5. By this pendulum suspension of the slide shoe and the spray nozzles connected thereto, the slide shoe and the spray nozzles will keep their positions in relation to the filter disc 6 during its rotation. FIG. 1 also shows a tube connection 10 for the spray gas or liquid and an elastic hose 11 between this connection and the tube connection 7 for the spray nozzles.

FIGS. 2 and 3 show the apparatus of FIG. 1 from both sides and show more clearly the suspension of the slide shoe 4 and the spray nozzles 8, 9 as a pendulum, so that an oscillation can take place in the axial direction of the filter disc 6. In the embodiment shown in FIGS. 1 to 3 the suspension has been accomplished by means of a leaf spring 3 When using such a spring the spring force should be small in relation to the reaction forces from the spray nozzles, or the difference between the reaction forces when they are directed towards each other, since otherwise the slide shoe can come into contact with the guide rail for long periods of time.

FIGS. 4 and 5 show an alternative embodiment of the pendulum suspension wherein the leaf spring used in the embodiment of FIGS. 1-3 has been omitted. The slide shoe with the spray nozzles is suspended in an oscillating fashion by the elastic hose 11 serving as supply means for the spray gas or liquid. FIGS. 4 and 5 also show an alternative embodiment wherein the slide shoe and the spray nozzles have been combined into one unit 12 comprising a slide shoe having bored channels 13 for the spray gas or liquid.

FIG. 6 shows in larger scale a part of the periphery of the disc sector 6. The disc sectors are usually covered with synthetic wire cloth 15; which in the form of a so called cloth sack is wrapped over the entire sector. Hereby also the periphery of the filter disc becomes covered with cloth and also here a fiber layer is formed which normally is very hard to remove. By positioning the guide rail 5 above the cloth 15 at the periphery the advantage is obtained that the fiber layer 16 bordering against the guide rail 5 very easily can be removed therefrom by the jets from the spray nozzles 8, 9. The spray jets come easily in below the fiber layer for breaking free the filter cake from the cloth without first need to penetrate the entire fiber layer.

FIG. 6 also shows the normal position of the slide shoe 4 relative to the guide rail 5. The gap, the play, between the slide shoe and guide rail should preferably be 2-3 mm on each side of the guide rail for an air spray and 2-5 mm for a water spray. The flings can be of greater order of magnitude but the oscillating suspension of the slide shoe permits the slide shoe to follow the disc flings.

The invention is not limited to the use of only liquid or gas as the spray media. In certain cases it has been proved to be extremely effective to have a mixture of gas and liquid, such as air and water.

Above has been described the use of the invention for removing fiber layer from the filter. The fiber layer being removed is a filter cake which, due to its content of material and the longitudinal extension thereof has as striking unit and not so easily crumbled. If such a filter cake is loosened at one end of the filter the entire cake falls off by its own weight. Filter cakes in the cellulose and paper industry have such characteristics but similar cakes can also be formed within other technical fields. The invention is also applicable within such other fields.

We claim:

1. Apparatus for removing a fiber layer from a rotating disc filter consisting of a number of filter discs mounted side by side on a common shaft, each filter disc having a periphery, said apparatus comprising
    gas and/or liquid spray means for removing the fiber layer and positioned close to each such periphery of the filter disc,
    a slide shoe fixed in relation to said spray means, and guide means positioned about the periphery of the filter disc for guiding said slide shoe,
    said slide shoe being arranged with play relative to said guide means and being suspended by a pendulum means that permits an oscillation to take place in the axial direction of the filter discs in response to axial movement of the filter discs.

2. Apparatus according to claim 1, wherein said play and the distance of said spray means to the periphery of the filter disc is of the same order of magnitude.

3. Apparatus according to claim 1 or 2, wherein the play is 2-5 mm.

4. Apparatus according to claim 1 wherein said pendulum means comprises a spring element.

5. Apparatus according to claim 4, wherein said spring element is a leaf spring.

6. Apparatus according to claim 1 wherein said pendulum means comprises an elastic hose for the supply of the gas and/or liquid to said spray means.

7. Apparatus according to claim 1 wherein said spray means is positioned ahead of said slide shoe in the direction of rotation of the filter disc.

8. Apparatus according to claim 1 wherein said spray means and said slide shoe consist of one unit provided with spray channels therein.

* * * * *